United States Patent
Umemoto et al.

(10) Patent No.: US 7,290,829 B2
(45) Date of Patent: Nov. 6, 2007

(54) WORKING VEHICLE WITH A CAB

(75) Inventors: Tomeo Umemoto, Sennan (JP); Koichi Hasegawa, Kobe (JP); Hideo Fujita, Sennan (JP); Koichiro Kan, Toyonaka (JP); Toshinobu Owada, Hannnan (JP); Tetsuya Yamamoto, Sakai (JP); Toshimitsu Yazaki, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/166,912

(22) Filed: Jun. 24, 2005

(65) Prior Publication Data

US 2006/0006696 A1   Jan. 12, 2006

(30) Foreign Application Priority Data

| Jun. 29, 2004 | (JP) | ............................. 2004-191985 |
| Jun. 29, 2004 | (JP) | ............................. 2004-191986 |
| Jun. 29, 2004 | (JP) | ............................. 2004-191987 |
| Jun. 29, 2004 | (JP) | ............................. 2004-191988 |

(51) Int. Cl.
    *B60J 7/00* (2006.01)
(52) U.S. Cl. ............................. 296/190.08; 296/190.05
(58) Field of Classification Search ........... 296/190.08, 296/190.1, 190.11
    See application file for complete search history.

(56) References Cited

U.S. PATENT DOCUMENTS

| 2,395,769 | A | * | 2/1946 | Thornton ..................... 180/294 |
| 4,094,545 | A | * | 6/1978 | Kramer .................. 296/190.08 |
| 4,097,085 | A |   | 6/1978 | Nelson et al. |
| 4,772,065 | A | * | 9/1988 | Nakata et al. ......... 296/190.08 |
| 5,016,722 | A | * | 5/1991 | Morita et al. .......... 296/190.05 |
| 5,119,718 | A | * | 6/1992 | Wagner et al. .............. 296/208 |
| 5,286,081 | A | * | 2/1994 | Martin, Jr. ............. 296/190.08 |
| 5,906,248 | A | * | 5/1999 | Nagaike et al. .......... 180/89.14 |
| 5,975,833 | A | * | 11/1999 | Yamada et al. ............. 414/687 |
| 6,149,228 | A | * | 11/2000 | O'Neill et al. ......... 296/190.08 |
| 6,189,955 | B1 | * | 2/2001 | Fryk et al. ............. 296/190.08 |
| 6,206,457 | B1 | * | 3/2001 | Sakyo et al. ........... 296/190.08 |
| 6,244,369 | B1 | * | 6/2001 | Yunoue et al. ......... 296/190.08 |
| 6,322,136 | B2 |   | 11/2001 | Boyce et al. |
| 6,394,212 | B1 | * | 5/2002 | Takano et al. ........... 180/89.13 |

(Continued)

FOREIGN PATENT DOCUMENTS

DE   10013065   9/2001

(Continued)

OTHER PUBLICATIONS

New Holland TL-A Series Tractors Catalogue excerpt.

(Continued)

*Primary Examiner*—Kiran B. Patel
(74) *Attorney, Agent, or Firm*—The Webb Law Firm

(57) ABSTRACT

A working vehicle with a cab is disclosed. The working vehicle comprises a vehicle body for supporting said cab; ground-engaging means for supporting said vehicle body; and a cab frame provided to said cab, said cab frame including right and left front posts, right and left rear posts, and right and left upper frames extending fore and aft between upper end regions of said front posts and upper end regions of said rear posts, respectively; wherein at least part of said cab is curved to bulge outward.

13 Claims, 12 Drawing Sheets

U.S. PATENT DOCUMENTS

| | | | |
|---|---|---|---|
| 6,409,254 B2 * | 6/2002 | Tiziano | 296/190.08 |
| 6,523,905 B2 * | 2/2003 | Tamura et al. | 298/22 R |
| 6,543,830 B1 * | 4/2003 | Stuck | 296/77.1 |
| 6,543,840 B2 * | 4/2003 | Colliar et al. | 296/190.08 |
| 6,568,746 B2 * | 5/2003 | Sakyo et al. | 296/190.08 |
| 6,578,907 B2 * | 6/2003 | Teich | 296/190.08 |
| 6,582,010 B2 * | 6/2003 | Sakyo et al. | 296/190.08 |
| 6,729,031 B2 * | 5/2004 | McKee | 296/190.1 |
| D505,432 S * | 5/2005 | Antonetti | D15/30 |
| 6,902,024 B2 * | 6/2005 | Müller et al. | 180/271 |
| 6,938,677 B2 * | 9/2005 | Yamakawa et al. | 165/42 |
| 6,957,853 B2 * | 10/2005 | Williams et al. | 297/93 |
| 7,007,999 B1 * | 3/2006 | Schneller | 296/90 |
| 7,021,702 B1 * | 4/2006 | Vandendriessche et al. | 296/190.08 |
| 7,048,082 B2 * | 5/2006 | Mori et al. | 296/190.08 |
| 7,055,881 B2 * | 6/2006 | Kindred | 296/37.6 |
| 2002/0149232 A1 | 10/2002 | Sakyo et al. | |
| 2004/0195867 A1 * | 10/2004 | Williams et al. | 297/93 |
| 2004/0212221 A1 * | 10/2004 | Sato | 296/190.08 |

FOREIGN PATENT DOCUMENTS

| | | |
|---|---|---|
| EP | 0773124 | 5/1997 |
| FR | 2846677 | 5/2004 |
| JP | 60-124363 | 8/1985 |
| JP | 7001947 | 1/1995 |
| JP | 11-91641 | 4/1999 |
| JP | 200219029 | 8/2000 |
| JP | 2006008073 | 1/2006 |
| JP | 2006008074 | 1/2006 |
| JP | 2006008075 | 1/2006 |
| JP | 2006008076 | 1/2006 |

OTHER PUBLICATIONS

John Deere 5020 Series Catalogue excerpt.
Massey Ferguson 6475 Catalogue excerpt.
John Deere Power Catalogue excerpt.

* cited by examiner

WORKING VEHICLE WITH A CAB

BACKGROUND OF THE INVENTION

This invention relates to a cab apparatus having a cab with a cab frame mounted on a vehicle body such as a tractor.

In a cab apparatus having a cab mounted on a vehicle body such as a tractor, the cab frame may have a box-like configuration including a pair of right and left front struts, a pair of right and left rear struts, and an upper frame structure. The upper frame structure has an upper front frame, a pair of right and left upper frames and an upper rear frame. Conventionally, this type of cab apparatus has the front struts, rear struts, upper front frame, upper side frames and upper rear frame of the cab frame formed straight (see for example, Publication of Japanese Patent application Nos. 2000-219029 and H7-1947).

In order to increase the working space in the cab interior to improve operability and comfort, or visibility, therefore, the conventional cab must enlarge the entire cab frame longitudinally and transversely by increasing the distance between the right and left front struts as well as the distance between the front struts and rear struts. Thus, there has been room for improvement in terms of design.

SUMMARY OF THE INVENTION

A working vehicle with a cab in accordance with the invention comprises:

a vehicle body for supporting said cab;

ground-engaging means for supporting said vehicle body; and a cab frame provided to said cab, said cab frame including right and left front posts, right and left rear posts, and right and left upper frames extending fore and aft between upper end regions of said front posts and upper end regions of said rear posts, respectively;

wherein at least part of said cab is curved to bulge outward.

By outwardly bulging the posts and/or inner surfaces forming the cab, an enlarged working space or a better visibility is achieved with the cab. Specifically, the operator visibility is improved when, as an example of at least part of said cab being curved to bulge outward, upper front frame is curved to bulge upwardly with respect to lateral ends of the upper front frame.

Japanese patent applications Nos. 2004-191985, 2004-191986, 2004-191987, 2004-191988 which are all filed on Jun. 29, 2004 are incorporated herein by reference.

DETAILED DESCRIPTION OF PREFERRED EMBODIMENTS

Embodiments of the invention will be described hereinafter with reference to the drawings. While a plurality of embodiments are disclosed hereinafter, it is considered possible within the scope of this invention to combine features of one embodiment with features of the other embodiments as long as no conflict occurs. The expression "bulge outward" or similar expression is used throughout the specification. The "outward" or "outwardly" in this context means one of upward, downward, toward right or left, forwardly, rearwardly, or any direction between these directions unless clearly specified.

Figure 1:
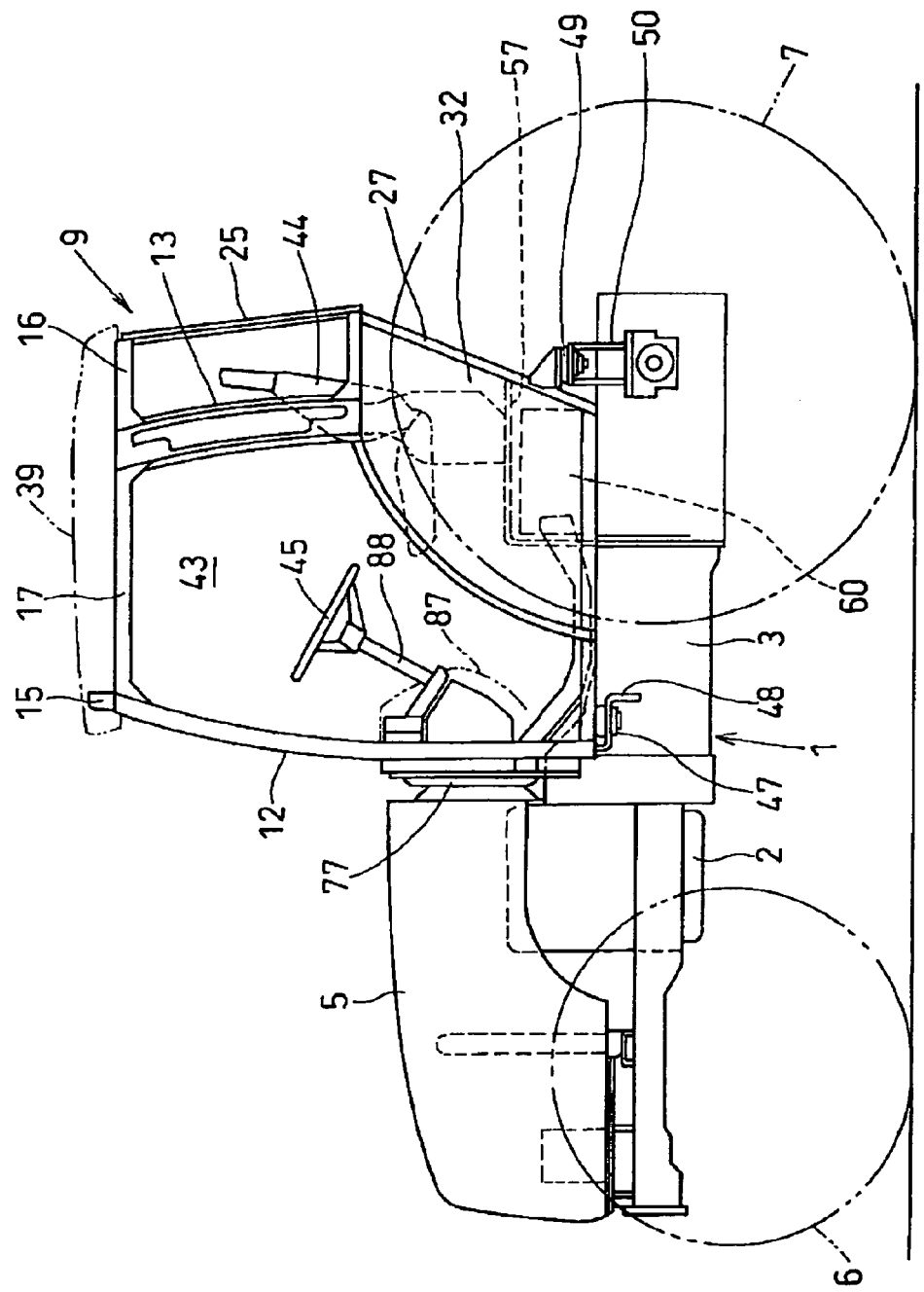
FIG. 1 is a side view of a tractor in one embodiment of this invention.
Figure 2:
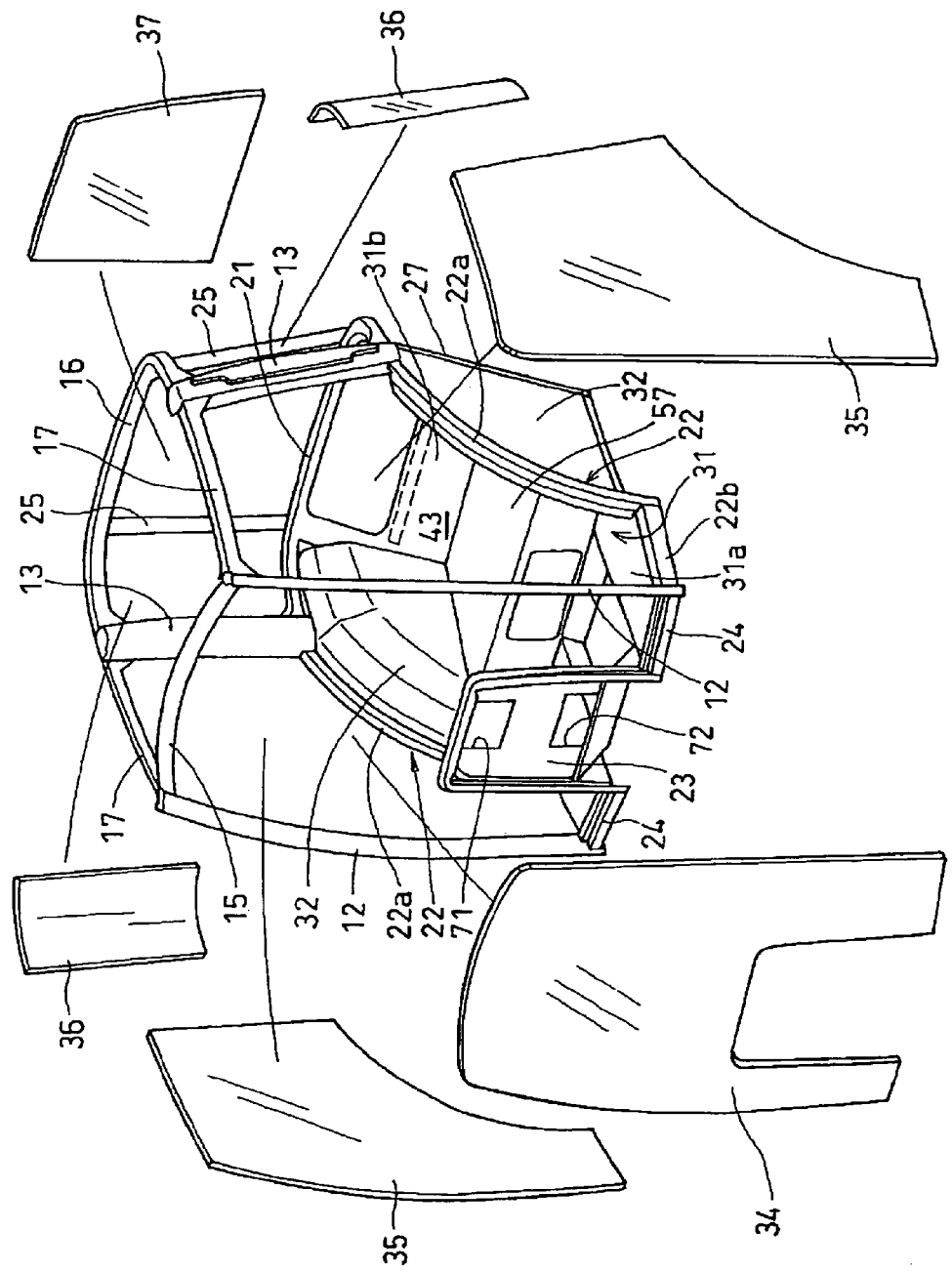
FIG. 2 is a perspective view of a cabin according to the invention.

In FIG. 1, a vehicle body 1 of a tractor, which is an example of working vehicles, is formed of an engine 2 and a transmission case 3 directly coupled to each other. The vehicle body 1 includes a hood 5 mounted on a front portion thereof for covering the engine 2, and a pair of right and left front wheels 6 attached to the front portion. The vehicle body 1 includes also a pair of right and left rear wheels 7 disposed in rear positions thereof, and a pair of right and left rear wheel fenders, not shown, covering the rear wheels 7. A cab 9 is mounted on a rear portion of the vehicle body 1. In FIGS. 1 through 8, the cab 9 has a cab frame 11 providing a framework therefor. As broadly described hereinafter, the cab frame 11 has an outwardly expanding box shape as a whole. The cab frame 11 includes a pair of right and left front posts 12 arranged in front positions thereof, a pair of right and left rear posts 13, an upper front frame 15 interconnecting upper ends of the right and left front posts 12 and curved upward in an arch form, an upper rear frame 16 interconnecting upper ends of the right and left rear posts 6, and a pair of right and left upper frames 17 each interconnecting the upper ends of the front and rear posts 12 and 13 at the same right or left side. The upper front frame 15, upper rear frame 16 and right and left upper frames 17 constitute an upper frame assembly. The cab frame 11 acts as a rollover protective structure (ROPS).

The cab frame 11 further includes a lower rear frame 21 interconnecting lower ends of the right and left rear posts 6, a pair of right and left lower frames 22 each interconnecting lower ends of the front and rear posts 12 and 13 at the same right or left side, a front panel 23 disposed between lower parts of the right and left front posts 12, a pair of right and left lower connecting frames 24 interconnecting lower ends of the front posts 12 and the front panel 23, a pair of right and left rear connecting frames 25 interconnecting the upper rear frame 16 and the lower rear frame 21, a pair of right and left lower inclined frames 27 extending forward and downward from the lower rear frame 21, and a pair of right and left lower support frames 28 each interconnecting the lower connecting frame 24 and lower inclined frame 27 at the same right or left side. Each of the right and left lower frames 22 includes an arcuate frame 22a extending along an upper surface of the rear wheel fender, and a front frame 22b interconnecting a forward end of the arcuate frame 22a and the lower end of the front post 12. The front panel 23 is disposed in a transversely middle position in a lower front part of the cab frame 11, to act as a partition dividing the engine 2 (interior of the hood 5) and a cab chamber 43 (interior and exterior of the cab 9) described hereinafter. The cab frame 11 has, at the bottom thereof, a floor sheet 31 formed of sheet steel. A pair of right and left side panels 32 are arranged at opposite sides of the floor sheet 31 and inwardly of the rear wheel fenders. The right and left front posts 12 are curved to bulge laterally outward gradually as they extend from the upper and lower ends to vertically approximately middle portions thereof. The right and left front posts 12 are curved also to incline rearward so that the upper portions above the vertically approximately middle positions thereof are located gradually rearward as they extend toward the upper ends. The right and left rear posts 13 are curved to bulge laterally outward gradually as they extend from the upper ends to the lower ends, to correspond to the upper halves the pair of front posts 12.

The upper front frame 15 is curved in an arch form to bulge upward as it extends from the right and left ends to the transversely middle position. The right and left upper frames 17 are curved to bulge laterally outward as they extend from the front and rear ends to longitudinally middle positions thereof. The upper rear frame 16 is curved so that right and left portions thereof are directed gradually largely forward as they extend toward the right and left ends. The lower rear frame 21 is curved so that right and left portions thereof are directed gradually largely forward as they extend toward the right and left ends, to correspond to the upper rear frame 16. The floor sheet 31 includes a forward, horizontal sheet portion 31a and a rearward, inclined sheet portion 31b. The horizontal plate portion 31a is disposed in horizontal posture on the right and left lower support frames 28. The inclined sheet portion 31b is disposed between the right and left lower inclined frames 27, and is inclined rearward and upward from the rear end of the horizontal sheet portion 31a. The opposite, right and left end regions of the inclined sheet portion 31b are superposed on and fixed to the right and left lower inclined frames 27. The horizontal sheet portion 31a of the floor seat 31 is fixed to the right and left lower support frames 28. The opposite, right and left ends of the horizontal sheet portion 31a are fixed to lower ends of the right and left side panels 32, and to the front frames 22b of the lower frames 22. The front end of the horizontal sheet portion 31a is fixed to the right and left lower connecting frames 24. Each of the right and left side panels 32 is fixed to the arcuate frame 22a of the lower frame 22, an outer portion of the lower rear frame 21 and a rear portion of the lower support frame 28.

A front windshield 34 is disposed in a space surrounded by the right and left front posts 5, upper front frame 15, right and left lower connecting frames 24 and front panel 23. A pair of right and left entrance doors 35 are provided, each disposed in a space surrounded by the front post 12 and rear post 13, upper frame 17 and lower frame 22 at the same right or left side. A pair of right and left side windows 36 are provided, each disposed in a space surrounded by the outer portion of the upper rear frame 16 and outer portion of the lower rear frame 21, rear post 13 and rear connecting frame 25 at the same right or left side. A rear window 37 is disposed in a space surrounded by a middle portion of the upper rear frame 16, a middle portion of the lower rear frame 21 and right and left rear connecting frames 25.

Figure 6:
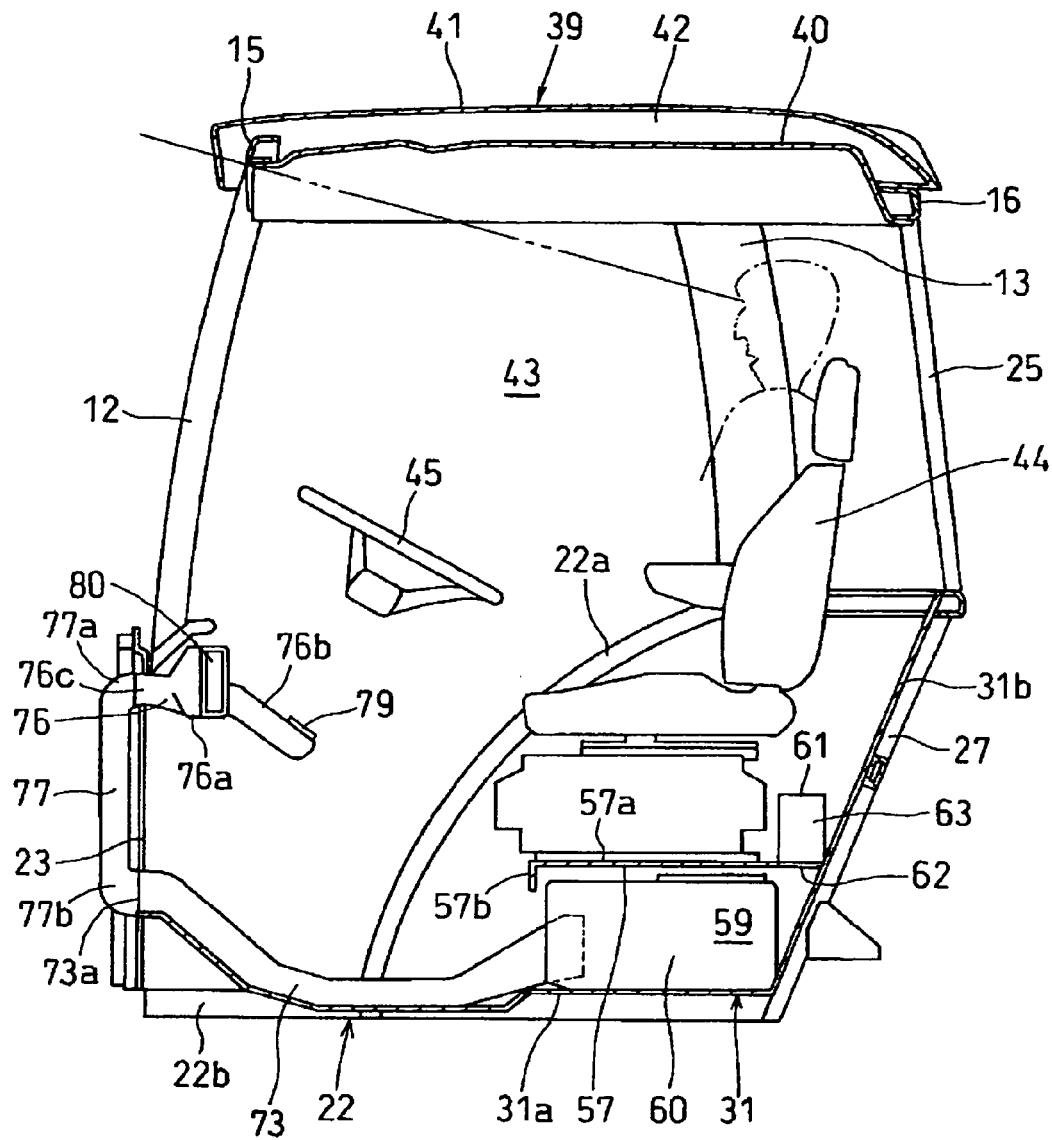
FIG. 6 is a sectional left side view of the cabin according to the invention.
Figure 7:
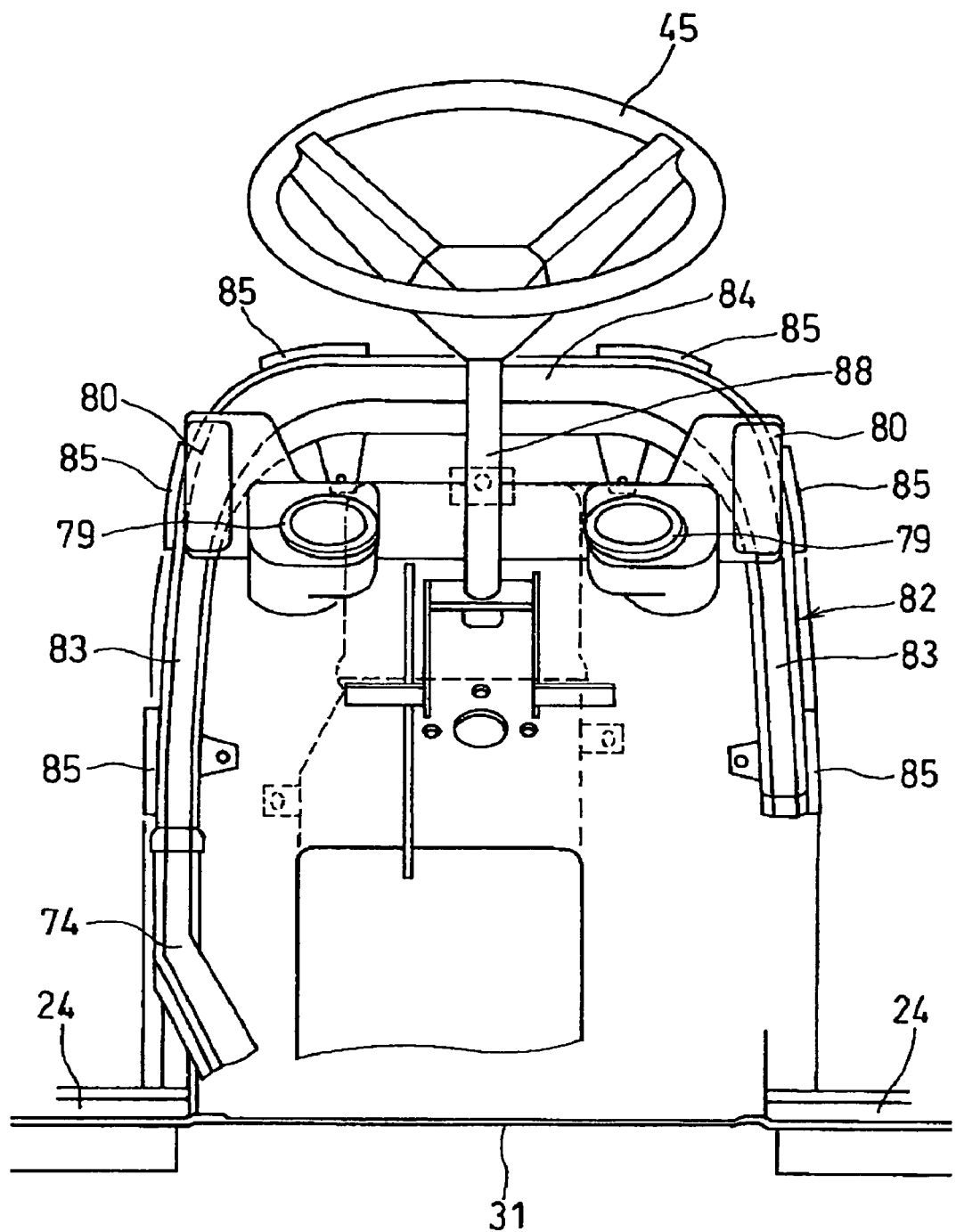
FIG. 7 is a rear view showing a front portion seen from an interior of the cabin according to the invention.
Figure 8:
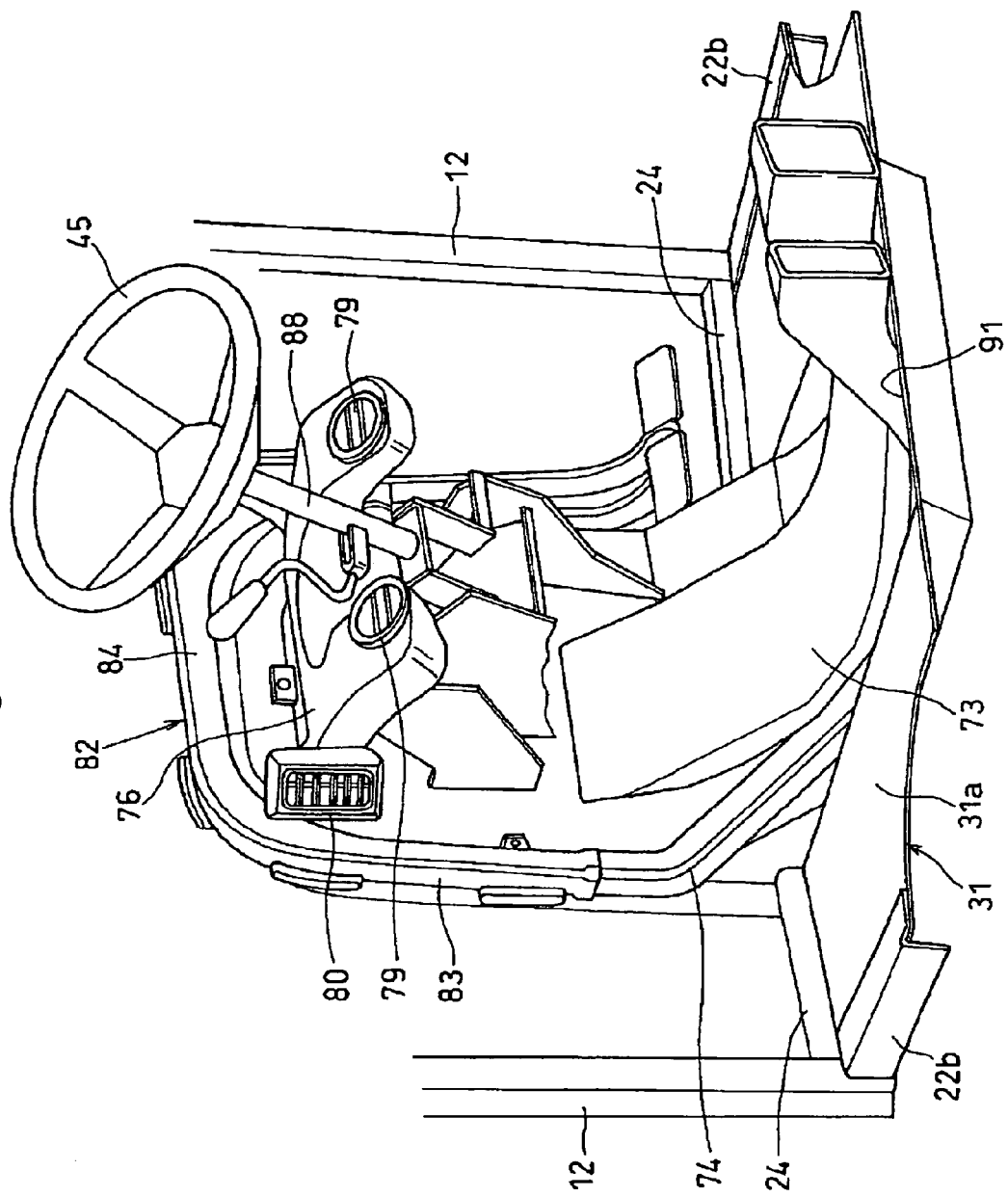
FIG. 8 is a perspective view of the front portion of the cabin according to the invention.

As shown in FIG. 6, a roof 39 is mounted on top of the cab frame 11. The roof 39 includes an inner roof 40 and an outer roof 41. The inner roof 40 provides a ceiling of the cab chamber 43 described hereinafter. The outer roof 41 is disposed above the inner roof 40, and a hollow space 42 is formed between the inner roof 40 and outer roof 41. Thus, the cab chamber 43 is formed inside of the cab 9, as surrounded by the roof 39, front windshield 34, front panel 23, entrance doors 35, side windows 36, rear window 37, side panels 32 and floor sheet 31. A driver's seat 44 is disposed in a rear portion of the cab chamber 43, and a steering wheel 45 is disposed in a forward portion of the cab chamber 43. The driver's seat 44 is disposed in a middle position transversely of the cab chamber 43, and between the rear wheel fenders. The steering wheel 45 is disposed forwardly of the driver's seat 44.

As shown in FIG. 1, front mounting members 48 protrude from front parts of the right and left lower support frames 28 through vibration proof members 47. Rear mounting members 50 protrude from lower parts of the right and left lower inclined frames 27 through vibration proof members 49. The cab 9 is attached to the vehicle body 1 by fixing the front mounting members 48 to lateral surfaces of the transmission case 3 of the vehicle body 1, and fixing the rear mounting members 50 to the rear axle case of the vehicle body 1.

Figure 10:
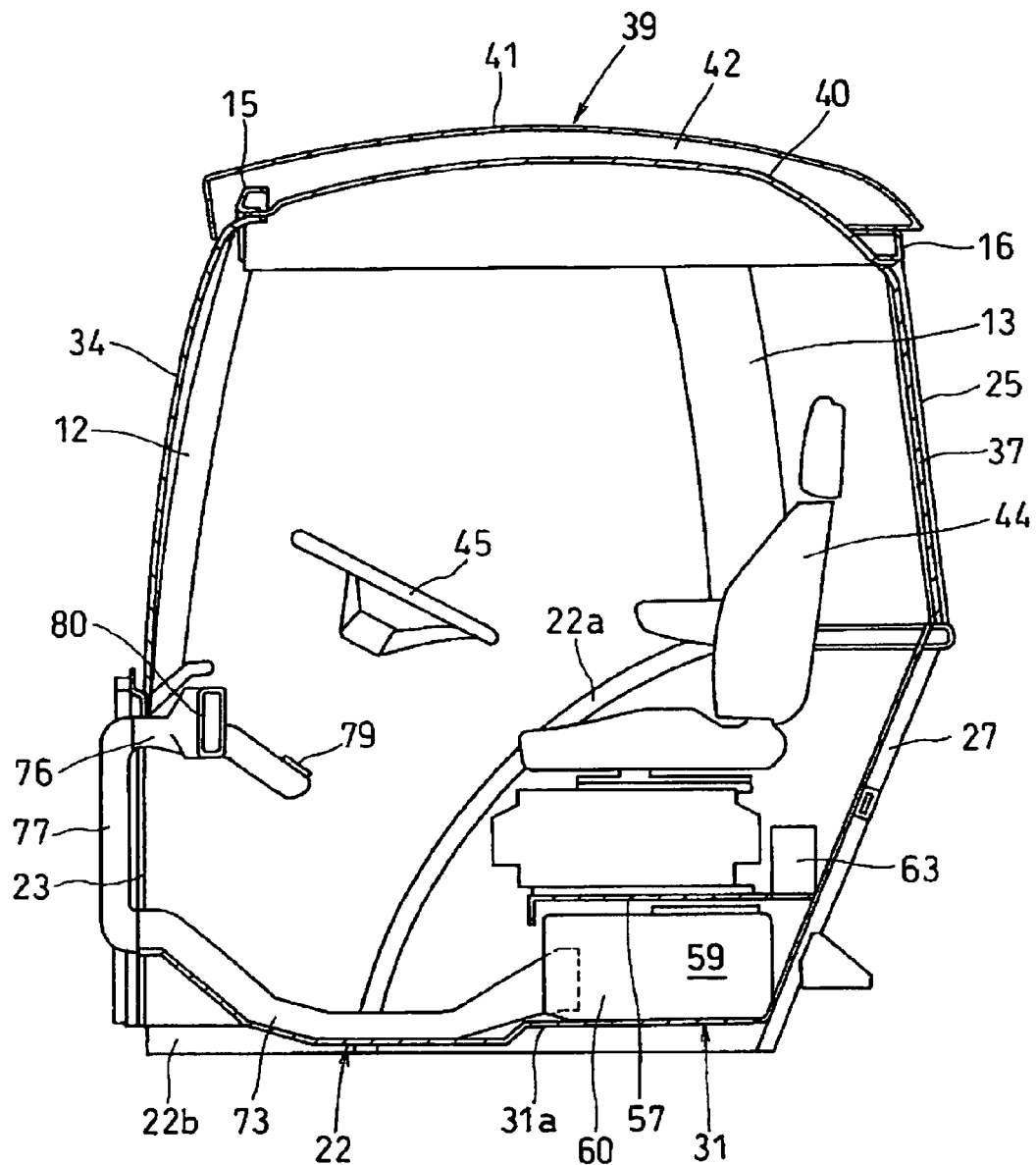
FIG. 10 is a sectional left side view of a cab apparatus.

As is clear from the embodiment shown in FIG. 10, an upper portion of an inner front surface of the cab 9 is inclined gradually rearward as it extends upward from a vertically intermediate position. An upper inner surface of the cab 9 is curved to bulge gradually upward as it extends from the front and rear ends to a longitudinally middle position. That is, an upper portion of the front windshield 34 is inclined gradually rearward as it extends upward from a vertically intermediate position. An undersurface of the roof 39 (inner roof 40) is curved to bulge gradually upward as it extend from the front and rear ends to a longitudinally middle position.

An upper end region of the inner front surface of the cab 9 and a forward end region of the upper inner surface of the cab 9 are arranged to be continuous to define a curved surface directed gradually largely rearward as it extends upward. A rear end region of the upper inner surface of the cab 9 and an upper end region of the inner rear surface of the cab 9 are arranged to be continuous to define a curved surface directed gradually largely downward as it extends rearward. That is, an upper end region of the front windshield 34 and a forward end region of the undersurface of the roof 39 (inner roof 40) are arranged to be continuous to define a curved surface directed gradually largely rearward as it extends upward. A rear end region of the undersurface of the roof 39 and an upper end region of the rear window 37 are arranged to be continuous to define a curved surface directed gradually largely downward as it extends rearward. The upper end region of the inner front surface of the cab 9 and the forward end region of the upper inner surface of the cab 9 may be substantially continuous with each other. The rear end region of the upper inner surface of the cab 9 and the upper end rear of the inner rear surface of the cab 9 may be substantially continuous with each other. The term "substantially continuous" used herein means that the two relevant parts may be continuous, or may be shaped to correspond to each other although they may be spaced from each other by an extent that would allow a finger to be inserted therebetween, for example.

Figure 4:
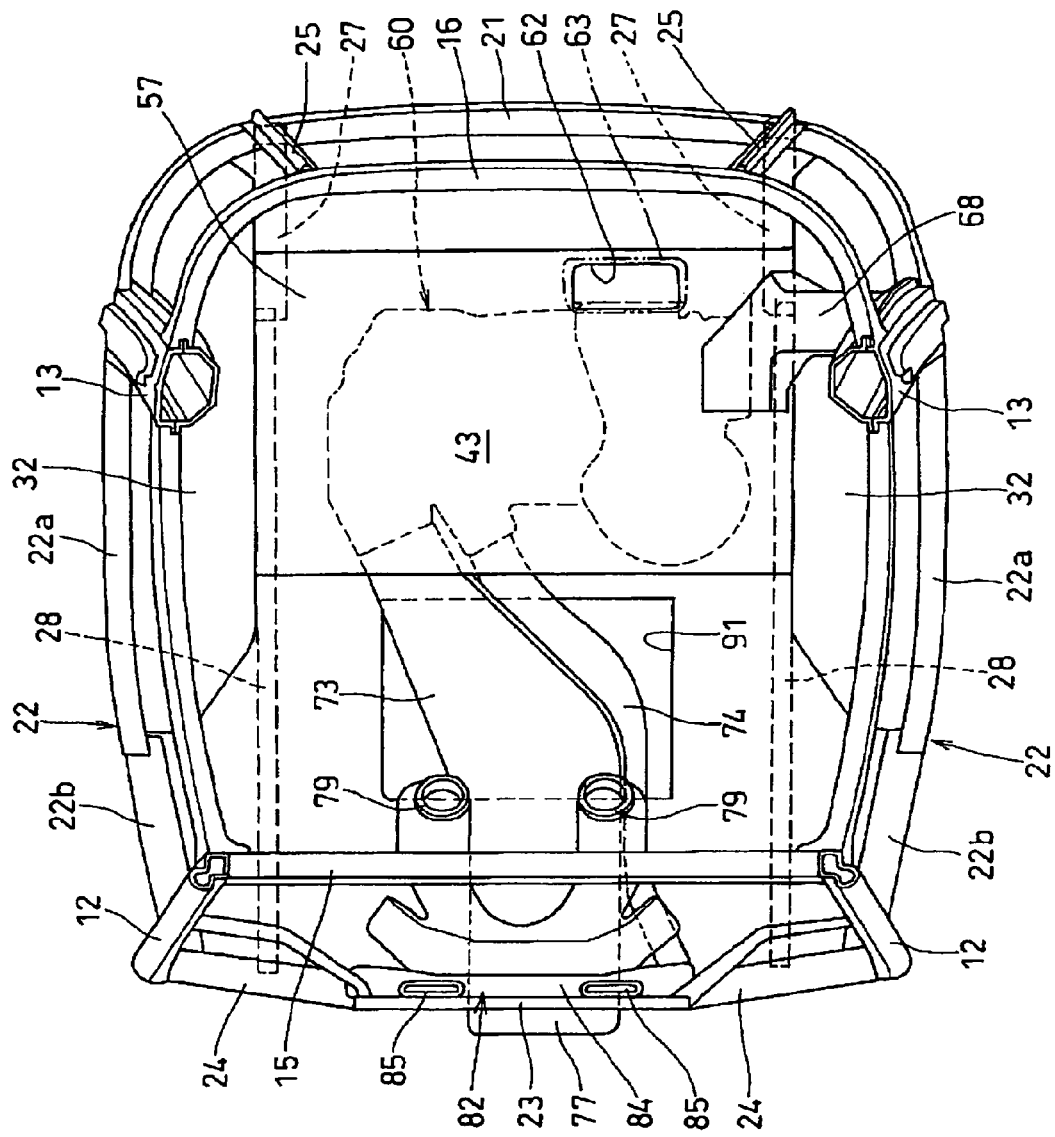
FIG. 4 is a plan view of the cabin according to the invention.

As shown in FIG. 4, right and left inner side surfaces of the cab 9 are curved to bulge laterally outward gradually as they extend from front and rear ends to longitudinally middle positions thereof. That is, the entrance doors 35 and side windows 36 are curved to bulge laterally outward gradually as they extend from front and rear ends to longitudinally middle positions thereof. A rear end region of each of the right and left inner side surfaces of the cab 9 is curved to extend gradually largely inward in the transverse direction as it extends rearward, to be continuous with a right or left end region of the inner rear surface of the cab 9. That is, a rear end region of each of the right and left side windows 36 is curved to extend gradually largely inward in the transverse direction as it extends rearward, to be continuous with a right or left end region of the rear window 37.

Figure 3:
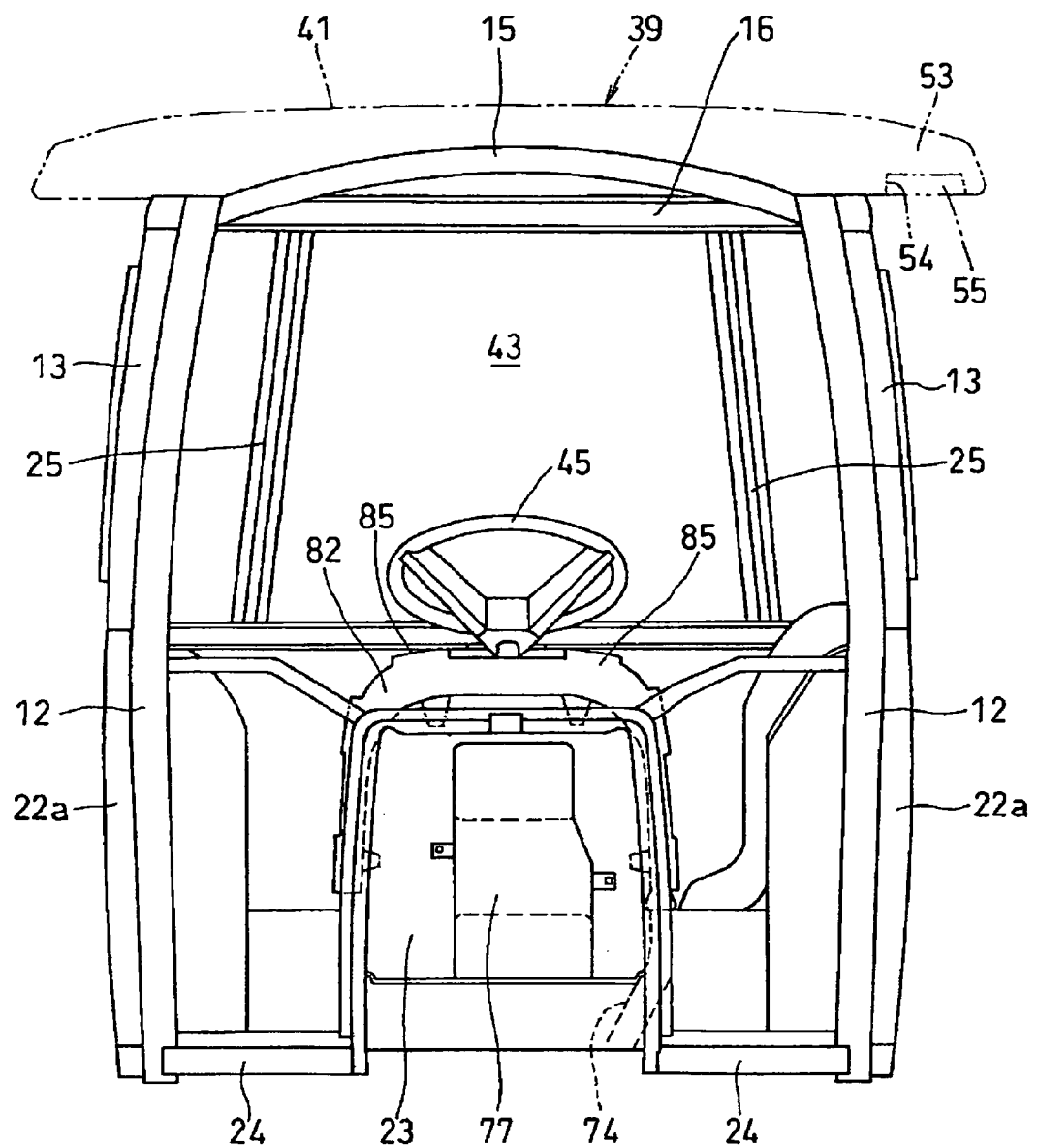
FIG. 3 is a front view of the cabin according to the invention.

An upper portion of an inner rear surface of the cab 9 is inclined gradually rearward as it extends downward from the upper end to a vertically intermediate position. That is, an upper portion of the rear window 37 is inclined gradually rearward as it extends downward from the upper end to a vertically intermediate position. The upper end of the front windshield 34 is curved to project forward of and extend below the upper front frame 15 of the cab frame 11. A lower portion below the upper end of the front windshield 34 is located forwardly of the upper front frame 15 of the cab frame 11. As shown in FIG. 3, the front end of the inner roof 40 is curved to bulge upward as it extend from the right and left ends to a transversely middle position thereof, to correspond to the upper front frame 15.

As shown in FIG. 3, the outer roof 41 includes a lateral projection 53 at the left side thereof, with an ambient air intake 54 formed in the undersurface of the projection 53. The projection 53 has a filter 55 is disposed so as to close the ambient air intake 54. Ambient air outside the cab 9 may be drawn from the ambient air intake 54 through the filter 55 into the hollow space 42 in the roof 39. The right and left rear posts 13 are in the form of hollow cylinders having a non-circular section. The left rear post 13 has an upper end thereof penetrating the inner roof 40, with an upper end opening communicating with the hollow space 42 in the roof 37. Thus, the left rear post 13 acts as an ambient air circulating duct, and the ambient air entering the hollow space 42 in the roof 39 is transmitted through the left rear post 13 to a lower area in the cab chamber 43.

An L-shaped storage space forming plate 57 is disposed below the driver's seat 44 in the rear position the cab 9. The storage space forming plate 57 acts also as a seat base, and includes an upper wall 57a vertically spaced from the floor sheet 31, and a front wall 57b extending downward, i.e. toward the floor sheet 31, from a front edge of the upper wall 57a. The storage space forming plate 57 is disposed between the side panels 32. A rear end of the storage space forming plate 57 is fixed close to the inclined sheet portion 31b of the floor sheet 31, a lower front end of the storage space forming plate 57 is fixed close to the horizontal plate portion 31a of the floor sheet 31, and right and left ends of the storage space forming plate 57 are fixed close to the right and left side panels 32. Thus, a sealed air conditioner body receiving chamber 59 is formed below the driver's seat 44 as surrounded by the storage space forming plate 57, side panels 32 and floor sheet 31. An air conditioner body 60 is housed in this air conditioner body receiving chamber 59.

Figure 9:
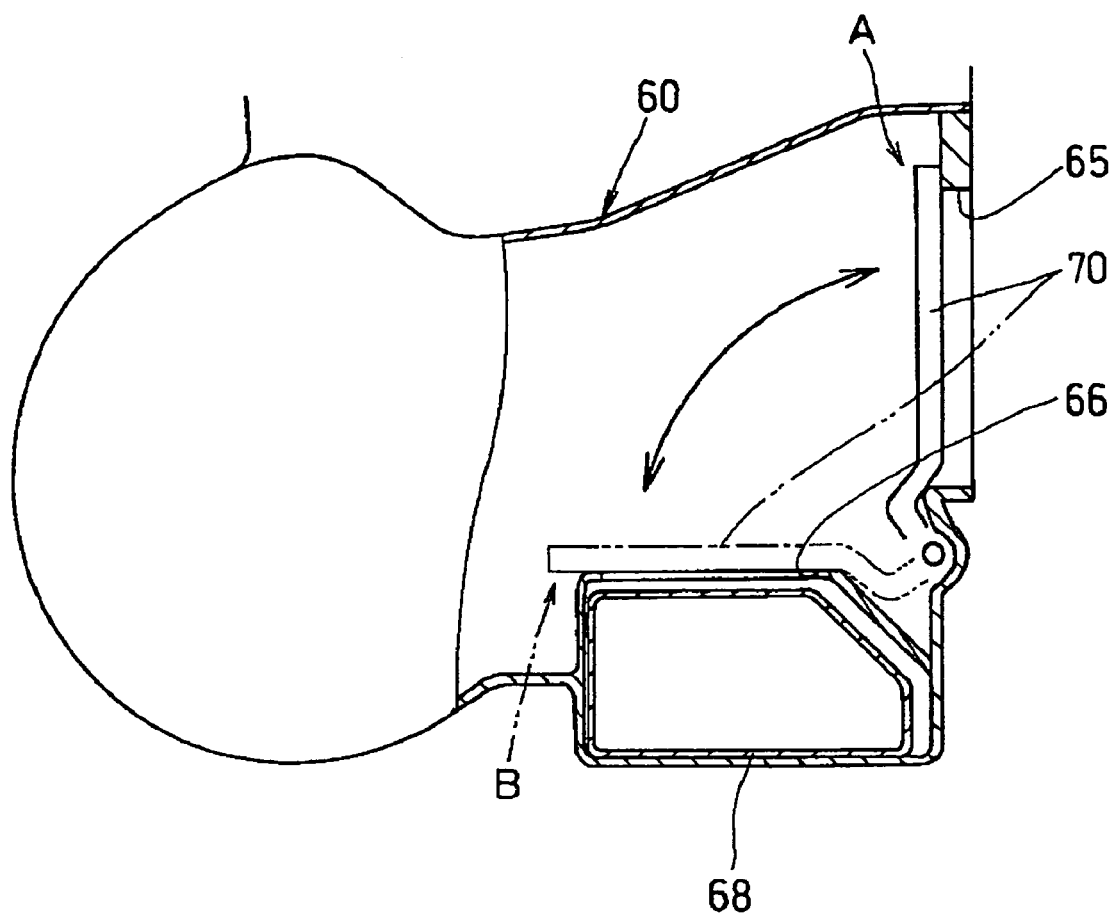
FIG. 9 is a sectional plan view of an air conditioner body.

The storage space forming plate 57 defining the air conditioner body receiving chamber 59 has a room air intake 62 formed in the upper wall thereof. A room air intake unit 61 closes the room air intake 62, with a filter 63 mounted in an opening of the room air intake 62 of the storage space forming plate 57. Thus, air in the cab chamber 43 may be drawn through the filter 63 and room air intake 62 into the air conditioner body receiving chamber 59. As shown in FIG. 9, the air conditioner body 60 contains an evaporator that evaporates a coolant to take heat away from the ambient and place the ambient in a cool state. The air conditioner body 60 has a room air inlet 65 for introducing air from the air conditioner body receiving chamber 59. An ambient air inlet 66 is disposed adjacent the room air inlet 65, i.e. formed in a side of the air conditioner body 60 close to the room air inlet 65.

Thus, the entire air conditioner body receiving chamber 59 acts as a duct for guiding room air having passed through the filter 63 to the air conditioner body 60. The room air intake unit 61 having the filter 63 may be disposed on any wall facing the interior of the cab 9, among the walls defining the air conditioner body receiving chamber 59. Thus, a high degree of designing freedom is provided for a position in which the room air intake unit 61 is located. Since the entire air conditioner body receiving chamber 59 acts as a duct, a space is not required for connecting a duct or for accommodating a filter rearwardly of the room air inlet 65 formed in the rear wall of the air conditioner body 60. The air conditioner body 60 can be located as close to the rear of the cab 9 as possible. This allows a large space (for placing the operator's feet) to be secured on a forward portion of the horizontal plate portion 31a of the floor sheet 31.

Figure 5:
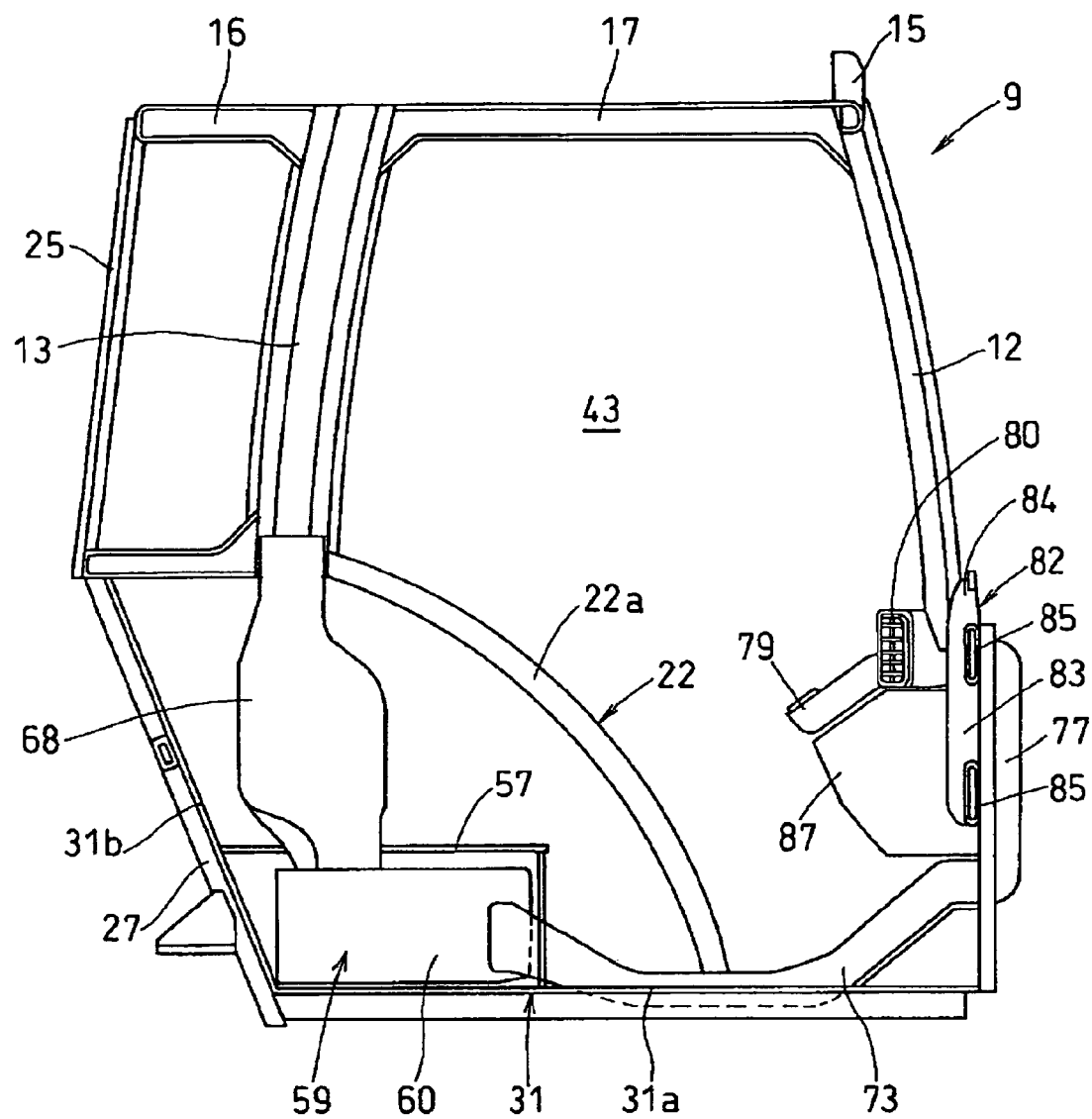
FIG. 5 is a sectional right side view of the cabin according to the invention.

The hood 5 houses a compressor for compressing the coolant, a radiator (condenser) for condensing and liquefying the coolant compressed by the compressor, while radiating heat, and an expansion valve for decompressing the coolant liquefied by the radiator to render the coolant easy to evaporate. The evaporator of the air conditioner body 60 is connected to the compressor and expansion valve through pipes, hoses or the like to evaporate the coolant decompressed by the expansion valve and return the coolant to the compressor. An ambient air circulating duct 68 is disposed in a lower left side of the rear end of the cab chamber 43. The ambient air circulating duct 68 extends along the inclined sheet portion 31b of the floor sheet 31, and has an upper end thereof connected to the lower end of the left rear post 13 through a connecting duct not shown. As shown in FIGS. 5 and 9, a lower end region of the ambient air circulating duct 68 penetrates the storage space forming plate 57 to be connected to the ambient air inlet 66 of the air conditioner body 60. The ambient air inlet 66 thus communicates with the lower end region of the ambient air circulating duct 68. Preferably, the ambient air circulating duct 68 is formed as flat in the transverse direction as possible, not to restrict the accommodation space in the cab 9.

As shown in FIG. 9, a switch damper 70 is disposed in the air conditioner body 60. The switch damper 70 is switchable between an ambient air introducing state A for closing the room air inlet 65 and introducing ambient air, and a room air introducing state B for closing the ambient air inlet port 66 and introducing room air. The front panel 23 has an upper duct insertion bore 71 and a lower duct insertion bore 72 formed therein. A first delivery duct 73 and a second delivery duct 74 extend from the air conditioner body 60 forward along the floor sheet (bottom) 31 of the cab 9 for guiding conditioned air outputted from the air conditioner body 60. The rear end of the first delivery duct 73 is connected to the air conditioner body 60, while the forward end of the first delivery duct 73 is inserted into the lower duct insertion bore 72 of the front panel 23.

An outlet-side main duct 76 is disposed adjacent the steering wheel 45, and a relay duct 77 is disposed in front of the front panel 23. The relay duct 77 is in the form of a cylinder or a box opening at the back, and is attached to the front surface of the front panel 23 to provide a communication between the upper duct insertion bore 71 and lower duct insertion bore 72 of the front panel 23. The outlet-side main duct 76 is bifurcated at the upper end of the front panel 23 to project to front positions. The outlet-side main duct 76 has a pair of front outlets 79 and a pair of right and left outlets 80 directed laterally. The rear end of the outlet-side main duct 76 is inserted into the upper duct insertion bore 71 of the front panel 23.

To describe the above in greater detail, the relay duct 77 is in the form of a tube having upper and lower connection openings 77a and 77b, and is disposed in front of the front panel 23 and detachably attached to the front panel 23 by screws or the like. The upper and lower connection openings 77a and 77b of the relay duct 77 are bent to face rearward. The upper connection opening 77a of the relay duct 77 is connected to a connection opening 76c of the outlet-side main duct 76. The lower connection opening 77b is connected to a front connection opening 73a of one of the delivery ducts 73. Thus, the connection opening 76c of the outlet-side main duct 76 is in communication with the front connection opening 73a of the delivery duct 73.

If the relay duct 77 were disposed inside the cab 9, the relay duct 77 would take up space inside the cab 9 to reduce the interior space of the cab 9. In this embodiment, the connection opening 76c of the outlet-side main duct 76 is in communication with the front connection opening 73a of the delivery duct 73 through the relay duct 77 disposed on the front panel 23 and outside the cab 9. Thus, the interior space of the cab 9 is not reduced, but provides an advantage of allowing a high degree of design freedom for arranging components inwardly of the front panel 23, inside the cab 9.

If the relay duct 77 were disposed inside the cab 9, the relay duct 77 might be complicated in structure because of limitations imposed by components inside the cab 8. A relay duct 77 bent into a complicated shape would have a disadvantage of increased air resistance. However, this embodiment realizes a simplified duct structure, and thus reduced air resistance. In addition, since the relay duct 77 is detachably attached to the outside of the cab 9, connection of the relay duct 77 is easy, and the interior of the relay duct 77 may be cleaned easily. It is not absolutely necessary for the relay duct 77 to be tubular. The relay duct 77 may be in any form to provide a communication between the connection opening 76c of the outlet-side main duct 76 and the front connection opening 73a of the delivery duct 73. For example, a cover may be provided for covering the connection opening 76c of the outlet-side main duct 76 and the front connection opening 73a of the delivery duct 73 (with the front panel 23 also acting as part of the duct in this case).

A defroster duct 82 is disposed on the front panel 23 and inside the cab chamber 43. The defroster duct 82 is fixedly attached to the front panel 23, and includes a pair of right and left side portions 83 extending substantially vertically, and an upper portion 84 extending substantially horizontally between upper ends of the right and left side portions 83. The rear end of the second delivery duct 74 is connected to the air conditioner body 60, while the forward end of the second delivery duct 74 is connected to a left side end of the defroster duct 82. The second delivery duct 74 guides conditioned air outputted from the air conditioner body 60 to the defroster duct 82. A plurality of outlet openings 85 are formed peripherally of the defroster duct 82 for discharging the conditioned air toward the front windshield 34, and upward and sideways. The right side end of the defroster duct 82 is closed.

An instrument panel 87 is attached to the defroster duct 82. The instrument panel 87 covers, from behind, a steering post 88 supporting the steering wheel 45, outlet-side main duct 76 and defroster duct 82. The instrument panel 87 defines openings corresponding to the outlets 79 and 80 of the outlet-side main duct 76 and outlet openings 85 of the defroster duct 82, for allowing the conditioned air to flow into the cab chamber 43. The horizontal sheet portion 31a of the floor sheet 31 forming the bottom of the cab 9 includes a recess 91 dented from above side. The first delivery duct 73 and second delivery duct 74 are fitted in the recess 91.

According to the above embodiment, when the air conditioner body 16 is driven, with the switch damper 70 switched to the ambient air introducing state A at this time to open the ambient air inlet 66 and close the room air inlet 65, ambient air outside the cab 9 is drawn from the ambient air intake 54 through the filter 55 into the hollow space 42 of the roof 39. The ambient air in the hollow space 42 is transmitted through the left rear post 13 to a lower position in the cab chamber 43. The ambient air then flows through the connecting duct not shown and the ambient air circulating duct 68 to be supplied to the air conditioner body 60 from the ambient air inlet 66. The air conditioned by the air conditioner body 60 is transmitted from the air conditioner body 60 forward through the first delivery duct 73 and second delivery duct 74 and along the floor sheet (bottom) 31. The conditioned air flows from the first delivery duct 73 through the relay duct 77 and outlet-side main duct 76 to be blown off from the outlets 79 and 80 of the outlet-side main duct 76 to rearward areas in the cab chamber 43. Further, the conditioned air flows from the second delivery duct 74 through the outlet-side main duct 76 to be blown off from the outlet openings 85 of the defroster duct 82 toward the front windshield 34 and other areas.

With the switch damper 70 switched to the room air introducing state B, the ambient air inlet port 66 is closed and the room air inlet 65 is opened. Then, air in the cab chamber 43 is drawn through the room air intake 62 and through the filter 63 into the air conditioner body receiving chamber 59, The air is supplied from the air conditioner body receiving chamber 59 through the room air inlet 65 to the air conditioner body 60. As when the switch damper 70 switched to the ambient air introducing state A, the air conditioned by the air conditioner body 60 is transmitted forward through the first delivery duct 73 and second delivery duct 74 to be blown off from the outlets 79 and 80 of the outlet-side main duct 76 to the rearward areas in the cab chamber 43, and to be blown off from the outlet openings 85 of the defroster duct 82 toward the front windshield 34 and other areas.

The air conditioner body 60 is disposed below the driver's seat 44, and the room air intake 62 for drawing the air in the cab chamber 43 to the air conditioner body 60 is disposed below and rearward of the driver's seat 44. The outlets 79, 80 and 85 for discharging the conditioned air from the air conditioner body 60 are disposed adjacent the steering wheel 45. The outlets 79, 80 and 85 for discharging the conditioned air, and the room air intake 62 for drawing the air in the cab chamber 43, are arranged in forward and rearward positions in the cab chamber 43 spaced a large distance apart across the driver's seat 44. Thus, the conditioned air blown from the outlets 79, 80 and 85 is circulated to the driver's seat 44 and to the entire cab chamber 43, and is returned smoothly to the air conditioner body 60 through the room air intake 54. An excellent air circulation in the cab chamber 43 is secured to realize an efficient air-conditioning performance.

The entrance doors 35 and side windows 36 are curved to bulge laterally outward gradually as they extend from front and rear ends to longitudinally middle positions thereof. Thus, the right and left inner surfaces of the cab 9 are curved to bulge laterally outward gradually as they extend from front and rear ends to longitudinally middle positions thereof. Consequently, the conditioned air blown from the outlets 79 and 80 of the outlet-side main duct 76 or the outlet openings 85 of the defroster duct 82 flows toward the room air intake 62, through the cab chamber 43, and along the right and left inner surfaces and rear inner surface (the entrance doors 35, side windows 36 and rear window 37) of the cab 9.

Moreover, the rear end region of each of the right and left side windows 36 is curved to extend gradually largely inward in the transverse direction as it extends rearward, to be continuous with the right or left end region of the rear window 37. Thus, the rear end region of each of the right and left inner surfaces of the cab 9 is curved to extend gradually largely inward in the transverse direction as it extends rearward, to be continuous with the right or left end region of the rear inner surface of the cab 9. The conditioned air flows smoothly, without any significant resistance to stop the flows, along the boundaries between the right and left inner surfaces and the rear inner surface of the cab 9. Further, the upper portion of the rear window 37 is inclined gradually rearward as it extends downward from the upper end to a vertically intermediate position. Thus, the upper portion of the inner rear surface of the cab 9 is inclined gradually rearward as it extends downward from the upper end to a vertically intermediate position. The conditioned air having reached the rear inner surface of the cab 9 descends smoothly along the inclination of the rear inner surface of the cab 9, and flows smoothly toward the room air intake 62.

The entrance doors 35 and side windows 36 are curved to bulge laterally outward gradually as they extend from front and rear ends to longitudinally middle positions thereof. Thus, the right and left inner surfaces of the cab 9 are curved to bulge laterally outward gradually as they extend from front and rear ends to longitudinally middle positions thereof. Consequently, the conditioned air blown from the outlets 79 and 80 of the outlet-side duct or the outlet openings 85 of the defroster duct 82 flows toward the room air intake 62, through the cab chamber 43, and along the right and left inner surfaces and rear inner surface (the entrance doors 35, side windows 36 and rear window 37) of the cab 9.

Moreover, the rear end region of each of the right and left side windows 36 is curved to extend gradually largely inward in the transverse direction as it extends rearward, to be continuous with the right or left end region of the rear window 37. Thus, the rear end region of each of the right and left inner surfaces of the cab 9 is curved to extend gradually largely inward in the transverse direction as it extends rearward, to be continuous with the right or left end region of the rear inner surface of the cab 9. The conditioned air flows smoothly from the right and left inner surfaces to the rear inner surface of the cab 9, without any significant resistance to stop the flows at the boundaries between the right and left inner surfaces and the rear inner surface of the cab 9.

Thus, the conditioned air blown from the outlets 79, 80 and 85 can be circulated very smoothly to the driver's seat 44 and the entire cab chamber 43, and returned to the air conditioner body 60 through the room air intake 54, to realize a highly efficient air-conditioning. In addition, with the cab chamber 43 having the curved inner surfaces, currents of the conditioned air flow along the inner surfaces of the front windshield 34, side windows 36 and rear window 37. Fogging of the windows 34, 36 and 37 or ice attached to the windows 34, 36 and 37 can be cleared or melted by the conditioned air. Thus, hot-wire glass conventionally used for the front windshield and rear window is no longer required. Since the outlets 79 and 80 of the outlet-side main duct 76 are arranged near the operator seated on the driver's seat 44, compared with the prior art, the air-conditioner has an improved cooling effect on the physical sensation.

According to the above embodiment, the right and left front posts 12 of the cab frame 11 are curved to bulge laterally outward gradually as they extend from the upper and lower ends to vertically middle positions thereof. The right and left upper frames 17 of the cab frame 11 are curved to bulge laterally outward as they extend from the front and rear ends to longitudinally middle positions thereof. Thus, part of the cab frame 11 is curved to bulge outward, thereby to expand a working space in the vertically middle area in the cab chamber 43 outwardly (forward and rearward, and right and left). The enlarged working space in the cab chamber 43 provides improved operability and comfort. Besides, it is unnecessary to increase the spacing between the right and left front posts 12, and the spacing between the right and left rear posts 13. It is also unnecessary to increase the spacing between the front posts 12 and rear posts 13. Thus, the cab frame 11 as a whole is not enlarged, so that manufacturing cost of the cab frame 11 and the cab 9 remains low, and the air-conditioning effect is not impaired.

The right and left front posts 12 are curved to incline rearward so that the upper portions above the vertically middle positions thereof are located gradually rearward as they extend toward the upper ends. The upper front frame 15 interconnecting the upper ends of the right and left front posts 12 is curved to bulge upward as it extends from the right and left ends to the transversely middle position. The upper end of the front windshield 34 is curved to project forward of and extend below the upper front frame 15 of the cab frame 11. A lower portion below the upper end of the front windshield 34 is located forwardly of the upper front frame 15 of the cab frame 11. Thus, compared with a conventional cab, the transversely middle portion of the upper front frame 15, along with the transversely middle portion at the front end of the inner roof 39, is located high and rearward. As shown in FIG. 6, the operator seated on the driver's seat 44 can have a very wide view upward and forward through an upper end region of the front windshield 34. The operator's field of view greatly enlarged upward and forward facilitates an operation using a front loader, for example. In addition, lamps or the like may be mounted on right and left end regions of the upper front frame 15, at the same height as in the prior art. An operation to attach the lamps is also easy.

FIG. 10 shows a different embodiment in which, compares with the foregoing embodiment, the cab 9 has an upper inner surface thereof curved to bulge to a large extent upward. That is, the undersurface of the roof 39 (inner roof 40) is curved to bulge to a large extent upward. The upper end of the inner front surface of the cab 9 and the front end of the upper inner surface of the cab 9 are continuous in a larger, gently sloping curved surface. The rear end of the upper inner surface of the cab 9 and the upper end of the inner rear surface of the cab 9 are also continuous in a larger, gently sloping curved surface. That is, the upper end of the front windshield 34 and the front end of the lower surface of the roof 39 (inner roof 40) are continuous in a larger, gently sloping curved surface. The rear end of the lower surface of the roof 39 and the upper end of the rear window 37 are also continuous in a larger, gently sloping curved surface. The other aspects of this embodiment are the same as in the foregoing embodiment.

Figure 11:
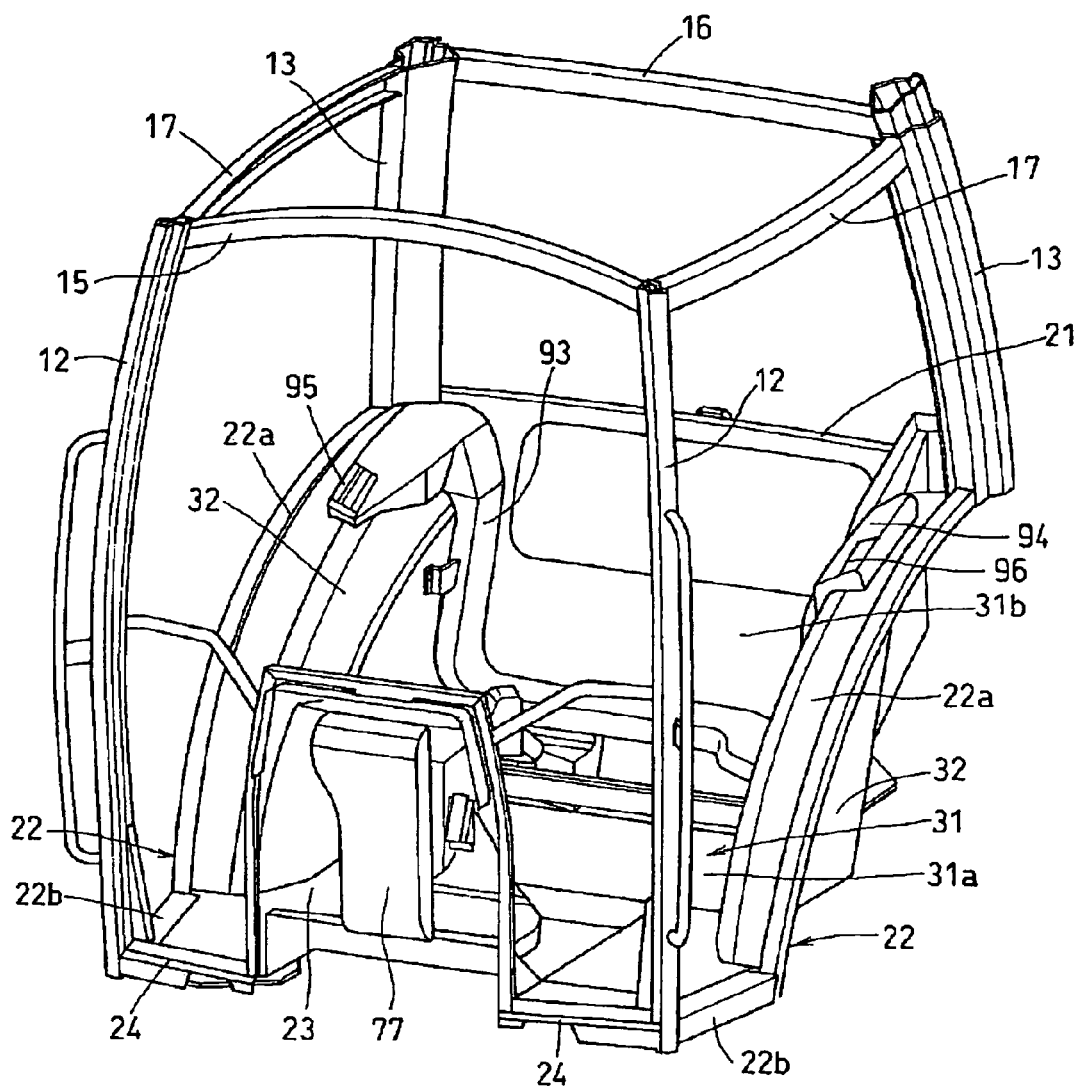
FIG. 11 is a perspective view of a modified cab apparatus.

FIG. 11 shows another embodiment in which the right and left rear posts 13 are arranged further rearward than in the foregoing embodiments. The right and left rear posts 13 project upward from the rear ends of the side panels 32. The upper rear frame 16 and lower rear frame 21 have right and left end regions not curved to extend forward, but project straight laterally outward to be connected to the right and left rear posts 13, respectively. The right and left rear connection frames 25 are now omitted, and so are the right and left side windows 36. A pair of right and left delivery ducts 93 and 94 extend over the rear wheel fenders 8 disposed laterally of the driver's seat 44, for transmitting conditioned air from the air-conditioner body 60, and discharging the conditioned air from above the rear wheel fenders. Outlets 95 and 96 of the delivery ducts 93 and 94 are arranged above the rear wheel fenders. The other aspects of this embodiment are the same as in the first embodiment.

In the above embodiments, the right and left front posts 12 are curved to bulge laterally outward gradually as they extend from the upper and lower ends to vertically middle positions thereof. The right and left upper frames 17 are curved to bulge laterally outward as they extend from the front and rear ends to longitudinally middle positions thereof. Thus, part of the cab frame 11 is curved to bulge outward, thereby to expand a working space in the vertically middle area in the cab chamber 43 outwardly. The components curved to bulge outward are not limited to the right and left front posts 12 or right and left upper frames 17. Instead of or in addition to these components, the upper front frame 15 of the cab frame 11 may be curved to bulge forward gradually as it extends from the right and left ends to a transversely middle position thereof, and/or the upper rear frame 16 of the cab frame 11 may be curved to bulge forward gradually as it extends from the right and left ends to a transversely middle position thereof. The right and left front posts 12 may be curved to bulge forward gradually as they extend from the upper and lower ends to the vertically middle positions thereof. Further, all, instead of part, of the cab frame 11 may be curved to bulge outward.

Figure 12:
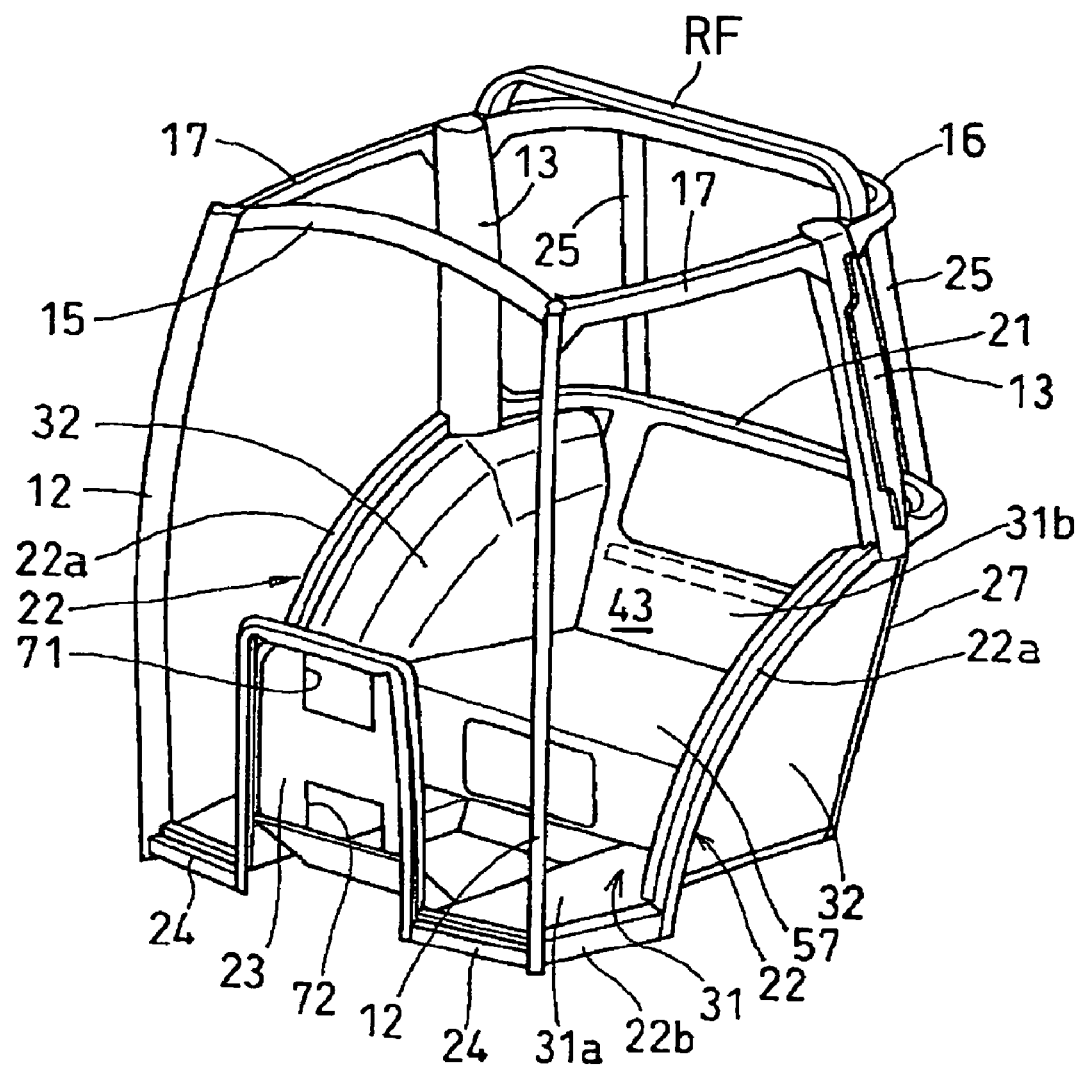
FIG. 12 is a perspective view of a further modified cab apparatus.

The cab frame 11 in the embodiment shown in FIG. 12 has a reinforcing frame RF extending between and fixed to the right and left upper frames 17. The reinforcing frame RF has a function to reinforce the upper frames 17 and prevent deformation of the upper frames 17. The reinforcing frame RF includes a pair of legs extending vertically and fixed to the right and left upper frames 17, respectively, and a horizontal portion connected to upper ends of the legs. The reinforcing frame RF has an upper surface located higher than the highest portion of the arch-shaped upper front frame 15.

The cab apparatus disclosed herein may be used not only for tractors having a plurality of wheels as disclosed in the above embodiments, but also for tractors having caterpillars (ground-engaging device).

Some of the particular features concerning the working vehicle with a cabin can be summarized as follows:

Each of the right and left front posts is curved to gradually bulge laterally outwardly such that a portion of each of the front posts, that is closer to a vertically approximately middle position of the front post, is displaced more laterally outwardly with respect to vertically opposite ends thereof.

Each of the right and left rear posts is curved to bulge laterally outwardly such that a portion of each of the rear posts, that is closer to a lower end of the rear post, is bulged more laterally outwardly with respect to an upper end thereof to correspond in shape to an upper halve of the corresponding front post.

Each of the right and left upper frames is curved to bulge laterally outward such that a portion of each of the upper frames, that is closer to a longitudinally approximately middle portion thereof, is bulged more laterally outwardly with respect to front and rear ends thereof.

Each upper half of the right and left front posts is gradually curved to incline rearwardly such that a higher portion of each of the front posts is displaced more rearwardly.

The upper front frame is curved to bulge upwardly such that a portion of the upper front frame, that is closer to a transversely approximately middle position thereof, is bulged further upwardly with respect to lateral ends of the upper front frame.

The cab includes a front windshield having an upper portion curved to bulge forwardly from the upper front frame as it extends downwardly such that a portion of the front windshield below the upper portion is located more forwardly of the upper front frame of the cab frame.

The working vehicle has a reinforcing frame extending between and fixed to said right and left upper frames of said cab frame. The reinforcing frame includes a pair of legs with each leg extending generally vertically and fixed to corresponding one of said right and left upper frames, and a substantially horizontal portion connected to upper ends of the legs. The reinforcing frame has an upper surface located higher than the highest portion of said upper front frame of said cab frame.

The cab includes right and left inner surfaces, each of which is curved to gradually bulge laterally outwardly such that a portion of each of the inner surfaces, that is closer to a longitudinally approximately middle position of the inner surface, is displaced more laterally outwardly with respect to front and rear ends of the inner surfaces.

The cab includes an inner roof having a lower surface which is curved to gradually bulge upward such that a portion of the lower surface, that is closer to a longitudinally approximately middle portion of the lower surface, is displaced higher than longitudinally end portions of the lower surface.

What is claimed is:

1. A working vehicle with a cab, comprising:
   a vehicle body for supporting said cab;
   ground-engaging means for supporting said vehicle body; and a cab frame provided to said cab, said cab frame including right and left front posts, right and left rear posts, an upper front frame extending between the right and left posts, and right and left upper frames extending fore and aft between upper end regions of said front posts and upper end regions of said rear posts, respectively;
   wherein at least part of said cab is curved to bulge outward;
   wherein each of said right and left upper frames is curved to bulge laterally outward such that a portion of each of the upper frames, that is closer to a longitudinally approximately middle portion thereof, is bulged more laterally outwardly with respect to front and rear ends thereof; and
   wherein said upper front frame is curved to bulge upwardly such that a portion of the upper front frame, that is closer to a transversely approximately middle position thereof, is bulged further upwardly with respect to lateral ends of the upper front frame.

2. A working vehicle as defined in claim 1, wherein each of said right and left front posts is curved to gradually bulge laterally outwardly such that a portion of each of the front posts, that is closer to a vertically approximately middle position of the front post, is displaced more laterally outwardly with respect to vertically opposite ends thereof.

3. A working vehicle as defined in claim 2, wherein each of said right and left rear posts is curved to bulge laterally outwardly such that a portion of each of the rear posts, that is closer to a lower end of the rear post, is bulged more laterally outwardly with respect to an upper end thereof to correspond in shape to an upper halve of the corresponding front post.

4. A working vehicle as defined in claim 2, wherein each upper half of said right and left front posts is gradually curved to incline rearwardly such that a higher portion of each of the front posts is displaced more rearwardly.

5. A working vehicle as defined in claim 1, wherein said cab includes a front windshield having an upper portion curved to bulge forwardly from said upper front frame as it extends downwardly such that a portion of said front windshield below said upper portion is located more forwardly of said upper front frame of said cab frame.

6. A working vehicle as defined in claim 1, further comprising a reinforcing frame extending between and fixed to said right and left upper frames of said cab frame.

7. A working vehicle as defined in claim 6, wherein said reinforcing frame includes a pair of legs with each leg extending generally vertically and fixed to corresponding one of said right and left upper frames, and a substantially horizontal portion connected to upper ends of the legs, said reinforcing frame having an upper surface located higher than the highest portion of said upper front frame of said cab frame.

8. A working vehicle as defined in claim 1, wherein said cab includes right and left inner surfaces, each of which is curved to gradually bulge laterally outwardly such that a portion of each of the inner surfaces, that is closer to a longitudinally approximately middle position of the inner surface, is displaced more laterally outwardly with respect to front and rear ends of the inner surfaces.

9. A working vehicle as defined in claim 1, wherein said cab includes an inner roof having a lower surface which is curved to gradually bulge upward such that a portion of the lower surface, that is closer to a longitudinally approximately middle portion of the lower surface, is displaced higher than longitudinally end portions of the lower surface.

10. A working vehicle as defined in claim 1, further comprising:
an air-conditioner body disposed below a driver's seat in a rear position of said cab; a delivery duct for guiding conditioned air outputted from said air-conditioner body,
said delivery duct extending forward from said air-conditioner body along a bottom of said cab;
a steering wheel disposed forwardly of said driver's seat;
an outlet-side duct for discharging the conditioned air from adjacent said steering wheel; and
a relay duct extending between said delivery duct and said outlet-side duct, said relay duct being disposed outside a front surface of said cab.

11. A working vehicle as defined in claim 10, further comprising:
a front panel acting as a partition between inside and outside of said cab, said front panel being located in a transversely middle region of a lower front portion of said cab frame; and a pair of upper and lower duct insertion bores formed in said front panel;
wherein said relay duct has an upper end thereof connected to said outlet-side duct through the upper duct insertion bore, and a lower end connected to said delivery duct through the lower duct insertion bore.

12. A working vehicle with a cab, comprising:
a vehicle body for supporting said cab;
ground-engaging means for supporting said vehicle body; and
a cab frame provided to said cab, said cab frame including:
a right front post;
a right rear post;
a right upper frame extending fore and aft between said right front post and said right rear post, and having a forward end connected at a first connection area to an upper end region of said right front post and a rear end connected at a second connection area to an upper end region of said right rear post;
a left front post;
a left rear post;
a left upper frame extending fore and aft between said left front post and said left rear post, and having a forward end connected at a third connection area to an upper end region of said left front post and a rear end connected at a fourth connection area to an upper end region of said left rear post; and
an upper front frame extending between said left front post and said right front post, and having a left end connected at a fifth connection area to said left front post, and a right end connected at a sixth connection area to said right front post, and wherein said upper front frame is curved upward in an arch form, such that the highest part of a lower edge of said upper front frame is located higher than an upper end of each of said right front post and said left front post;
a front windshield extending between said right and left front posts and, when seen from above, projecting forward beyond a straight line linking a front edge of said fifth connection area and a front edge of said sixth connection area;
a right side extending between said right front post and said right rear post and, when seen from above, curved to bulge rightward beyond a right edge of said first connection area and a right edge of said second connection area; and
a left side extending between said left front post and said left rear post and, when seen from above, curved to bulge leftward beyond a right edge of said third connection area and a left edge of said fourth connection area.

13. A working vehicle as defined in claim 12, wherein each of said right and left sides includes at least one of a door and a window pane.

* * * * *

(12) EX PARTE REEXAMINATION CERTIFICATE (17th)
Ex Parte Reexamination Ordered under 35 U.S.C. 257

United States Patent
Umemoto et al.

(10) Number: US 7,290,829 C1
(45) Certificate Issued: Jan. 26, 2015

(54) WORKING VEHICLE WITH A CAB

(75) Inventors: Tomeo Umemoto, Sennan (JP); Koichi Hasegawa, Kobe (JP); Hideo Fujita, Sennan (JP); Koichiro Kan, Toyonaka (JP); Toshinobu Owada, Hannnan (JP); Tetsuya Yamamoto, Sakai (JP); Toshimitsu Yazaki, Sakai (JP)

(73) Assignee: Kubota Corporation, Naniwa-Ku, Osaka-Shi, Osaka (JP)

Supplemental Examination Request:
No. 96/000,026, Jun. 21, 2013

Reexamination Certificate for:
Patent No.: 7,290,829
Issued: Nov. 6, 2007
Appl. No.: 11/166,912
Filed: Jun. 24, 2005

(30) Foreign Application Priority Data

Jun. 29, 2004 (JP) .................................. 2004-191985
Jun. 29, 2004 (JP) .................................. 2004-191986
Jun. 29, 2004 (JP) .................................. 2004-191987
Jun. 29, 2004 (JP) .................................. 2004-191988

(51) Int. Cl.
*B60J 7/00* (2006.01)

(52) U.S. Cl.
USPC .................................. 296/190.08; 296/190.05

(58) Field of Classification Search
USPC ...................... 296/193.12, 190.08, 190.1, 210
See application file for complete search history.

(56) References Cited

To view the complete listing of prior art documents cited during the supplemental examination proceeding and the resulting reexamination proceeding for Control Number 96/000,026, please refer to the USPTO's public Patent Application Information Retrieval (PAIR) system under the Display References tab.

*Primary Examiner* — Patricia Engle

(57) ABSTRACT

A working vehicle with a cab is disclosed. The working vehicle comprises a vehicle body for supporting said cab; ground-engaging means for supporting said vehicle body; and a cab frame provided to said cab, said cab frame including right and left front posts, right and left rear posts, and right and left upper frames extending fore and aft between upper end regions of said front posts and upper end regions of said rear posts, respectively; wherein at least part of said cab is curved to bulge outward.

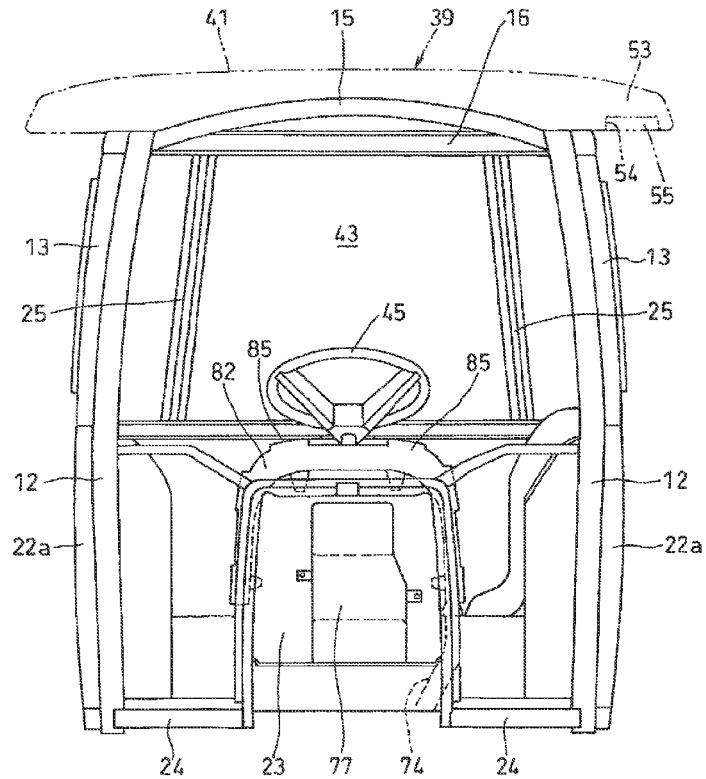

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-13 is confirmed.

New claims 14-22 are added and determined to be patentable.

14. *A working vehicle with a cab as defined in claim 1, wherein said upper front frame is configured for receiving an upper end of said front windshield.*

15. *A working vehicle with a cab as defined in claim 1, further comprising:*
*an upper rear frame extending between the right and left rear posts, wherein said upper front frame bulges upwardly relative to said upper rear frame.*

16. *A working vehicle with a cab as defined in claim 1, wherein said cab includes an inner roof having a lower surface which is curved to gradually bulge upward such that a portion of the lower surface, that is closer to a longitudinally approximately middle portion of the lower surface, is displaced higher than a longitudinally rear end portion of the lower surface.*

17. *A working vehicle with a cab as defined in claim 12, wherein said cab includes an inner roof having a lower surface which is curved to gradually bulge upward such that a portion of the lower surface, that is closer to a longitudinally approximately middle portion of the lower surface, is displaced higher than a longitudinally rear end portion of the lower surface.*

18. *A working vehicle as defined in claim 12, wherein each of said right and left front posts is curved to gradually bulge laterally outwardly such that a portion of each of the front posts, that is closer to a vertically approximately middle position of the front post, is displaced more laterally outwardly with respect to vertically opposite ends thereof.*

19. *A working vehicle with a cab as defined in claim 12, wherein said upper front frame is configured for receiving an upper end of said front windshield.*

20. *A working vehicle with a cab as defined in claim 12, wherein said cab includes an inner roof having a lower surface which is curved to gradually bulge upward such that a portion of the lower surface, that is closer to a longitudinally approximately middle portion of the lower surface, is displaced higher than longitudinally end portions of the lower surface.*

21. *A working vehicle with a cab as defined in claim 12, further comprising:*
*an upper rear frame extending between said right rear post and said left rear post, wherein said upper front frame bulges upwardly relative to said upper rear frame.*

22. *A working vehicle with a cab, comprising;*
*a vehicle body for supporting said cab;*
*ground-engaging means for supporting said vehicle body; and*
*a cab frame provided to said cab, said cab frame including:*
*a right front post;*
*a right rear post;*
*a right upper frame extending fore and aft between said right front post and said right rear post, and having a forward end connected at a first connection area to an upper end region of said right front post and a rear end connected at a second connection area to an upper end region of said right rear post;*
*a left front post;*
*a left rear post;*
*a left upper frame extending fore and aft between said left front post and said left rear post, and having a forward end connected at a third connection area to an upper end region of said left front post and a rear end connected at a fourth connection area to an upper end region of said left rear post;*
*an upper front frame extending between said left front post and said right front post, and having a left end connected at a fifth connection area to said left front post, and a right end connected at a sixth connection area to said right front post, and wherein said upper front frame is curved upward in an arch form, such that the highest part of a lower edge of said upper front frame is located higher than an upper end of each of said right front post and said left front post;*
*a front windshield extending between said right and left front posts and, when seen from above, projecting forward beyond a straight line linking a front edge of said fifth connection area and a front edge of said sixth connection area;*
*a right side extending between said right front post and said right rear post and, when seen from above, curved to bulge rightward beyond a right edge of said first connection area and a right edge of said second connection area; and*
*a left side extending between said left front post and said left rear post and, when seen from above, curved to bulge leftward beyond a right edge of said third connection area and a left edge of said fourth connection area; and*
*wherein said cab includes a front windshield having an upper portion curved to bulge forwardly from said upper front frame as it extends downwardly such that a portion of said front windshield below said upper portion is located more forwardly of said upper front frame of said cab frame.*

* * * * *